Figure 1:
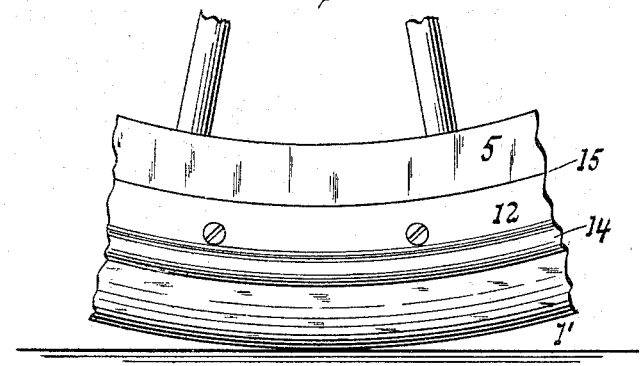

No. 642,189. Patented Jan. 30, 1900.
H. A. WHITING.
WHEEL TIRE.
(Application filed Mar. 2, 1899.)

(No Model.)

WITNESSES:
William Miller
Chas. E. Poensgen

INVENTOR:
Henry A. Whiting
BY
Hauff & Hauff
ATTORNEYS

UNITED STATES PATENT OFFICE.

HENRY A. WHITING, OF NEW YORK, N. Y., ASSIGNOR OF ONE-HALF TO ABEDNEGO DEWES, OF SAME PLACE.

WHEEL-TIRE.

SPECIFICATION forming part of Letters Patent No. 642,189, dated January 30, 1900.

Application filed March 2, 1899. Serial No. 707,514. (No model.)

*To all whom it may concern:*

Be it known that I, HENRY A. WHITING, a citizen of the United States, residing at Manhattan, in the city, county, and State of New York, have invented new and useful Improvements in Tires, of which the following is a specification.

This invention relates to that class of vehicle-wheels comprising wooden fellies, flexible tires, and clamping irons or plates for securing the tires to the fellies.

The flexible tire comprises a main body portion to be seated on the periphery of the felly and inwardly-extending side portions arranged to contact with the sides of the fellies and having at their edges interior ridges or beads formed to seat in grooves made in the side of the felly, the exterior of the tire also being provided with ridges or beads located opposite the junctures of the side portions with the body portion, one of the functions of said ridges or beads being to strengthen the flexible tire at such parts.

Another feature of my invention relating to flexible tires, as those made of rubber, is making the interior of the side portions, as well as the interior of the body portion, of the softer or more elastic quality of rubber than the outer surfaces, which outer surfaces are to be sufficiently hard and tenacious to withstand wear and offer suitable contacting surfaces for the clamping-irons or means used to secure the tire to the felly, the soft interior by its elasticity imparting the necessary flexibility to the tire and a yielding grip between the tire and the felly.

The invention also contemplates the use of springs with a flexible tire of the character described, said springs being preferably spiral in form and located in cells formed in the soft-rubber interior of the body portion, each spring being isolated and surrounded by the soft rubber. The springs play between the bottoms of the cells and the periphery of the felly or a strengthening-band placed on the felly. The means provided by me for securing the rubber tire to the felly consists of flat rings adapted to be clamped by bolts or similar means to the sides of the felly to firmly press and hold the ridges or beads on the interior of side portions into the grooves formed in the sides of the felly. These rings extend at their outer edges beyond the periphery of the felly, which outer edges are formed to embrace the exterior ridges or beads of the tire, thus constituting firm side supports for the tire by the outer edges of the rings embracing the tire beyond the periphery of the felly and a positive and secure connection between the tire and fellies by the locking action of the two ridges or beads on each side of the tire.

Figure 2:
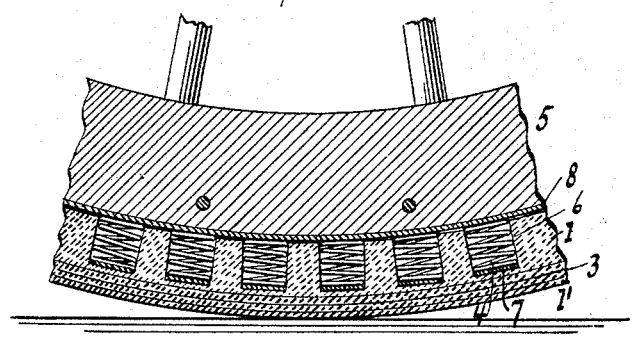
Figure 3:
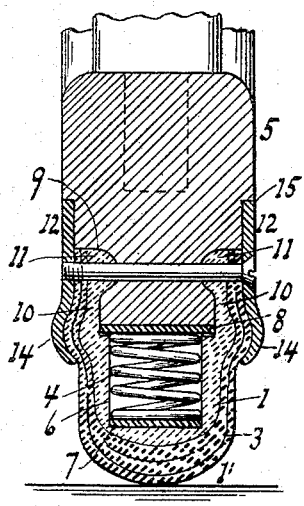

Figure 1 of the drawings is a side elevation of a part of a tire made according to my invention. Fig. 2 is a longitudinal sectional elevation of the same, and Fig. 3 is a transverse section of the felly and tire through one of the spring-cells.

The tire is composed of two qualities of rubber made integral—an outer covering of comparatively hard and tenacious rubber 1', which may be further strengthened by pieces of canvas or other suitable fabric 3, and which constitutes the tread and also extends to the edges of the side portions 10 10, forming contact-surfaces for the holding-rings 12 12, and an inside part 1, of comparatively soft and elastic rubber, which fills the body portion of the tire and rests against the periphery of the metal band 8, placed on the felly 5 and extending throughout the inner sides of the side portions 10 10, thus affording a yielding lining for contact with the sides of the felly 5, the inner edges of the side portions being provided with ridges or beads 11 11. These ridges or beads 11 11 seat in grooves 9 9, formed in the sides of the reduced outer edge of the felly 5, as clearly shown at Fig. 3, the sides of the tire being about flush with the sides of the felly.

The tire has also formed on its sides ridges or beads in line with or opposite to the junctures of the side portions 10 10 with the body portion, as at 14 14, thus greatly strengthening the tire at these points, which are ordinarily the weakest parts of flexible tires of this character.

In some cases I propose to place springs in the interior of the tire, which will preferably be spiral springs 4 4, located in cells 6 6, formed in the soft-rubber inner part of the body portion, said springs fitting snugly in the cells and surrounded by the soft rubber.

The inner ends of the springs 4 4 rest against the band 8 on the felly 5, and their outer ends bear against disks or caps of metal 7 7 at the bottoms of the cells.

The side portions of the tire are firmly held against the sides of the felly by means of the flat metal rings 12 12, which are by suitable means securely held in position, as by the screws shown in the drawings. These rings 12 12 have their outer edges so formed or bent as to embrace the ridges or beads 14 14, thus constituting, with the ridges or beads 11 11, a double lock on both sides of the tire and felly to hold the tire on the felly. The outer edges of the rings 12 12 by projecting beyond the periphery of the felly and embracing the tire at its sides well onto the body beyond the weakest parts of the tire insure the tire from serious damage or displacement under the most severe conditions of its use.

I claim as my invention—

1. In combination, a felly having grooves formed in its sides; a flexible tire comprising a body portion and inwardly-extending side portions provided with internal ridges or beads formed to seat in the side grooves of the fellies, said body portion having external ridges or beads formed on its sides beyond the periphery of the felly; and rings clamped to the sides of the felly and bearing against the side portion of the tire to hold their internal ridges in the grooves of the felly, and having their outer edges extended and formed to embrace the external ridges of the tire.

2. In combination, a flexible tire having side portions extending inwardly from the body portion and exterior ridges or beads opposite the junctures of the side portions with the body portion; a felly upon which the tire is placed with its side portions against the sides of the felly; and clamping-rings secured to the side of the felly, bearing against the side portions of the tire and with its outer edge extending beyond the periphery of the felly to support the sides of the body of the tire and formed to embrace the exterior ridges on the body.

3. In combination, a felly having grooves formed in its sides; a flexible tire comprising a body portion and inwardly-extending side portions, the outer parts of the body and side portions consisting of comparatively hard material and the inner parts of the body and side portions of a softer and more elastic material for contact with the felly, said side portions being provided at their edges internally with ridges or beads formed to seat in the side grooves of the felly, the soft interior of the body having cells formed therein; springs located in these cells, arranged to play between the bottoms of the cells and the periphery of the felly; and clamping-rings secured to the sides of the felly and bearing against the hard exterior parts of the sides of the body and side portions of the tire.

In testimony whereof I have hereunto set my hand in the presence of two subscribing witnesses.

HENRY A. WHITING.

Witnesses:
W. C. HAUFF,
E. F. KASTENHUBER.